United States Patent [19]

Koai

[11] Patent Number: 4,934,775

[45] Date of Patent: Jun. 19, 1990

[54] OPTICAL SPACE SWITCHES USING CASCADED COUPLED-WAVEGUIDE OPTICAL GATE ARRAYS

[75] Inventor: Kwang T. Koai, Acton, Mass.

[73] Assignee: GTE Laboratories Incorporated, Waltham, Mass.

[21] Appl. No.: 298,605

[22] Filed: Jan. 18, 1989

[51] Int. Cl.[5] ............................................. G02B 6/10
[52] U.S. Cl. .............................. 350/96.14; 350/96.13; 350/96.15; 350/96.16; 350/96.20
[58] Field of Search ............... 350/96.11, 96.12, 96.13, 350/96.14, 96.15, 96.16, 96.17, 96.20; 455/600, 612; 370/1, 3

[56] References Cited

U.S. PATENT DOCUMENTS

| | | | |
|---|---|---|---|
| 4,608,682 | 8/1986 | Nagashima et al. | 350/96.14 X |
| 4,618,210 | 10/1986 | Kondo | 350/96.14 |
| 4,787,692 | 11/1988 | Spanke | 350/96.16 |
| 4,798,429 | 1/1989 | Djupsjöbacka | 350/96.14 |
| 4,798,435 | 1/1989 | Fujiwara et al. | 350/96.13 |
| 4,815,027 | 3/1989 | Tokumitsu et al. | 350/96.14 X |
| 4,815,803 | 3/1989 | Faulkner et al. | 350/96.14 |
| 4,818,050 | 4/1989 | Duthie | 350/96.14 |
| 4,818,063 | 4/1989 | Takizawa | 350/96.13 |
| 4,822,124 | 4/1989 | Suzuki | 350/96.14 X |
| 4,840,447 | 6/1989 | Kataoka | 350/96.14 |
| 4,842,367 | 6/1989 | Djupsjöbacka | 350/96.14 |

OTHER PUBLICATIONS

R. C. Alferness, "Waveguide Electrooptic Switch Arrays", IEEE J. of Selected Areas in Comm., vol. 6, pp. 1117–1130 (1988).
A. Himeno, M. Kobayashi, "Single-Mode Guided--Wave . . . Gates", Electronic Letters, vol. 23, pp. 887–888 (1987).
M. Ikeda, "Laser Diode Switch", Electronic Letters, vol. 17, pp. 899–900 (1981).
R. C. Alferness, "Waveguide Electrooptic Modulator",
IEEE Trans. on Microwave Theory and Tech., MTT-30, pp. 1121–1137 (1982).
E. Voges, A. Neyer, "Integrated-Optic Devices . . . Communication", IEEE/OSAJ. of Lightwave Technology, vol. LT-5, pp. 1229–1238 (1987).
L. Thylen, "Integrated Optics in LiNbO$_3$: . . . Telecommunications", IEEE/OSAJ. of Lightwave Technology, vol. 6, pp. 847–861 (1988).
K. Koai, P. Liu, "Digital and Quasi-Linear . . . from Directional Couplers", IEEE J. Quantum Elect., vol. QE-22, pp. 2191–2194 (1986).

Primary Examiner—William L. Sikes
Assistant Examiner—Brian M. Healy
Attorney, Agent, or Firm—James J. Cannon, Jr.

[57] ABSTRACT

An optical space switch architecture is constructed from electro-optical gate arrays each comprised of a plurality of ultra-high-extinction optical intensity modulators which are in turn fabricated from cascaded directional waveguide coupler sections. Input optical signals are processed by 1-to-N passive splitter circuits for providing interim optical signals which are routed to the optical gtate arrays. Each interim signal is processed by an optical modulator and emerges, depending upon the activation of the particular gate, in either an ON or OFF state. The optical signals emerging from the gate arrays are routed to N-to-1 passive combiner circuits according to a connectivity configuration whereupon the incoming signals are combined before appearing at the output ports of the combiner circuits. Optical amplifiers are incorporated into the splitter and combiner circuits if power compensation is required. The point-to-multipoint connectivity configuration allows each input optical signal to be distributed to all of the output ports if so desired. The switching connections for establishing the desired distribution of the input optical signals among the output ports are implemented by turning ON or OFF the appropriate electro-optic gates in the gate array.

18 Claims, 7 Drawing Sheets

OPTICAL SPACE SWITCHES USING CASCADED COUPLED-WAVEGUIDE OPTICAL GATE ARRAYS

FIELD OF THE INVENTION

This invention pertains to optical devices and more particularly to an optical space switching architecture based on optical gate arrays.

BACKGROUND OF THE INVENTION

Optical space-division switching fabric is expected to be a backbone of future optical switching systems because of its very large switching bandwidth. In general, there are two types of switching elements to implement optical space-division switching fabric: deflection-type switches and optical gates. The class of deflection-type switches, among which include mechanical switches, reflection switches, grating switches, directional coupler switches, X-switches, and mode-sorting switches, as discussed by R.C. Alferness in IEEE Transactions on Microwave Theory and Techniques, 1982, operate by directing an incoming optical signal to one of two output ports according to a control signal. Existing switch matrices based on these switch elements, including lattice, duobanyan, cross-bar, rectangular crossbar, full-active tree, and half-active tree matrices, are shown in FIGS. 1-6, respectively, as a set of 4×4 switch matrices. A general overview of these architectures is provided in the following publications: Voges and Neyer, IEEE/OSA Journal of Lightwave Technology, 1987; L. Thylen, IEEE/OSA Journal of Lightwave Technology, 1988; and R.C. Alferness, IEEE Journal of Selected Areas in Communications, 1988.

Figure 1:
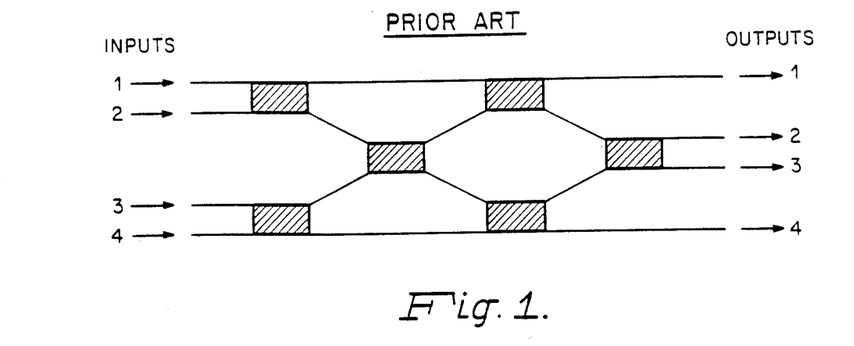
FIGS. 1 through 6 are circuit diagrams of a set of 4×4 switch matrices constructed from prior art deflection-type switching elements.
Figure 2:
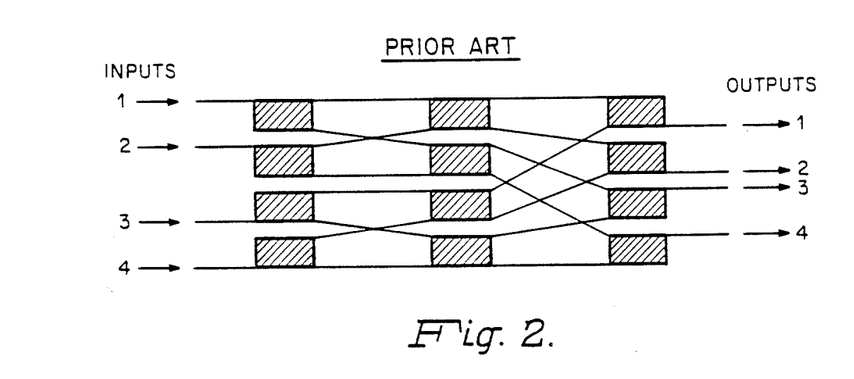
Figure 3:
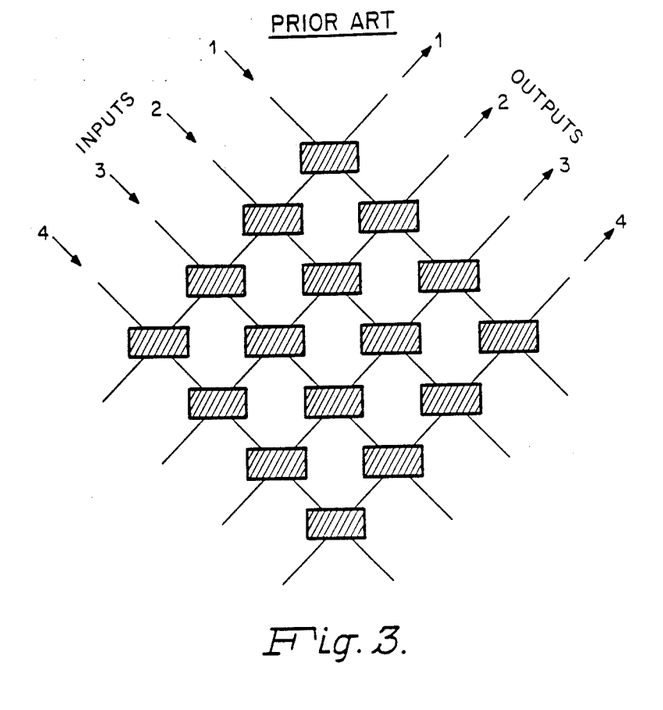
Figure 4:
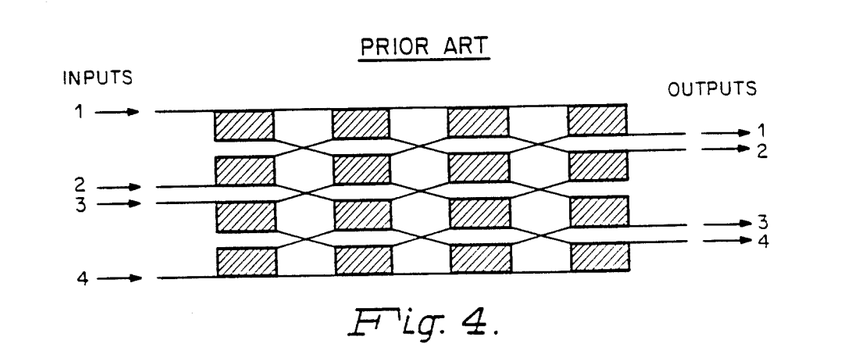
Figure 5:
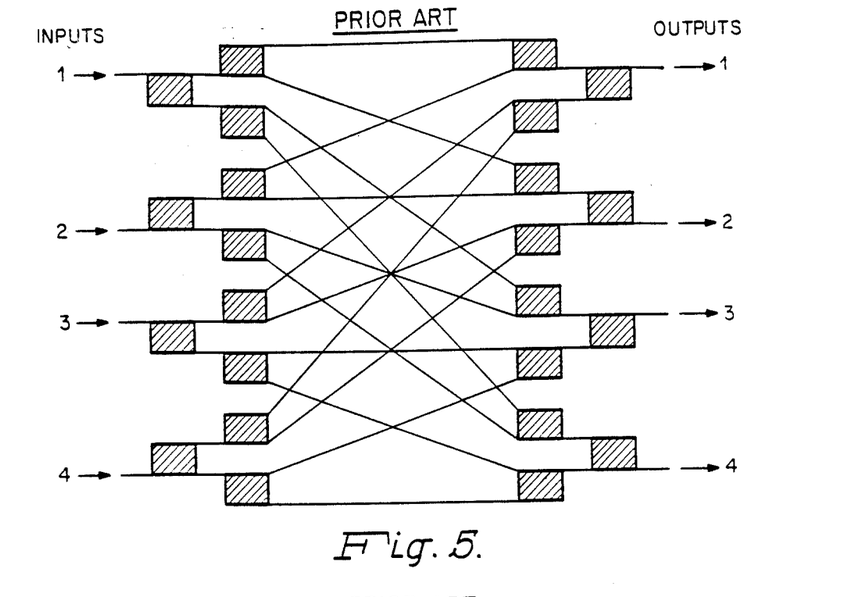
Figure 6:
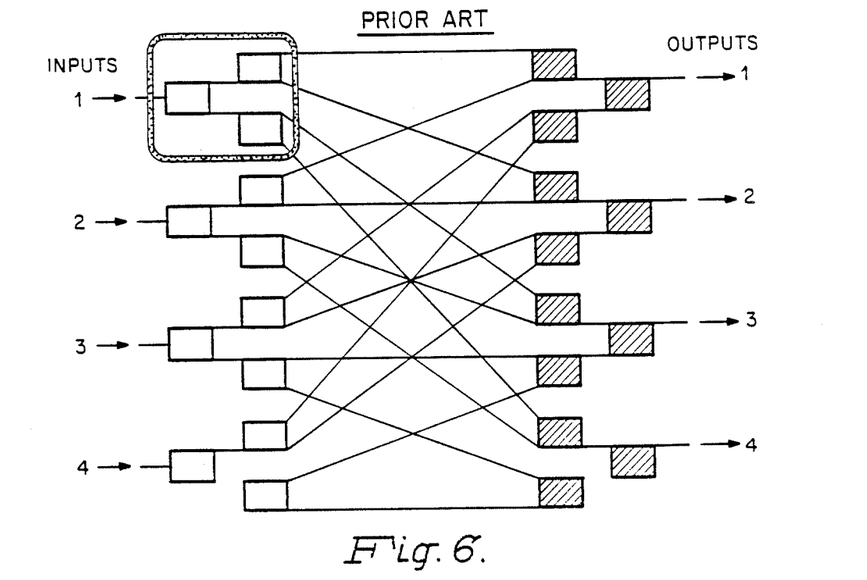
Figure 7:
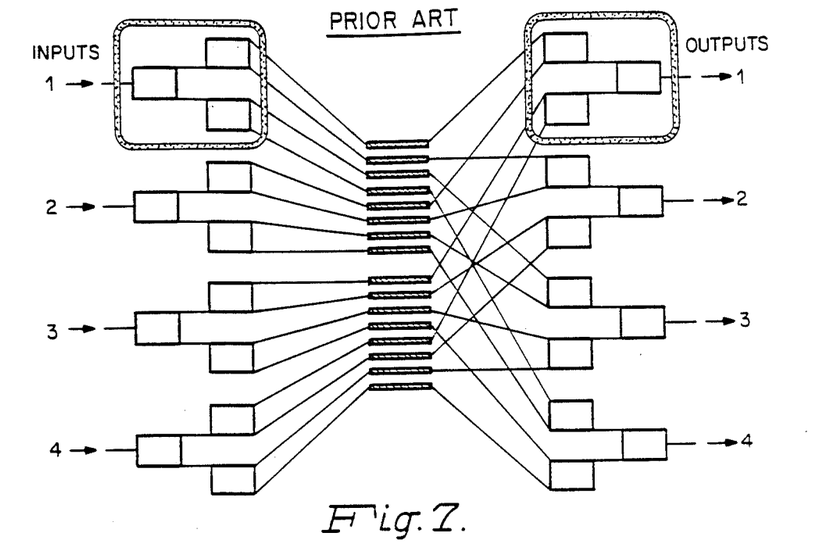
FIG. 7 is a prior art circuit diagram of a 4×4 optical gate switch matrix.

Contradistinctively, an optical gate switch as shown in FIG. 7 does not deflect the incoming optical signal. Rather, it divides the incoming optical signal among its two output gates wherein the switching is performed by the turn-on or turn-off of the gates. Switch matrices based on optical gates are basically a passive tree structure with an additional stage of optical gates. Himeno and Kobayashi in Electronic Letters, 1987, describe an optical-gate matrix switch using ON/OFF modulators such as Mach-Zehnder interferometers and cutoff modulators for optical gates. The optical gate can also be a switched laser diode amplifier, as suggested by M. Ikeda in Electronic Letters, 1981.

All of the above-mentioned switch structures, except the lattice structure, are strictly nonblocking matrices in which any unoccupied input/output ports can be connected without disturbing existing signal paths. Because several switches must be activated to set up a connection in a lattice matrix, some rearrangement of the switch activations may be required when new connections are requested. An obvious drawback is that some information is likely to be lost during this rearranging period. Accordingly, optical switch matrices based upon strictly nonblocking structures are usually preferred.

The nonblocking architectures still present difficulties despite their relative ease in connectivity. In the duobanyan and tree structures, more than one switch element must be activated to set up a connection, thereby requiring a more complicated control circuit which may slow down the switching set-up speed. In the crossbar matrices, the activation of only one switch element is sufficient to establish any designated point-to-point connection. However, the crossbar matrices are not suitable for the point-to-multipoint connections (or broadcasting) which are indispensable in fiber-optic video networks. The only deflection-device-based architecture that is suitable for point-to-multipoint connections is the half-active tree matrix.

With respect to the optical gate-type switch matrices, point-to-multipoint connections are inherent and switching is much faster and simpler than the tree matrices since each path is established by activating only one gate. The insertion loss of the gate-type switch matrices, however, is relatively high because they incur both splitting and combining optical losses. Recent progress in optical amplifiers have demonstrated that optical losses can be compensated by the amplifier gain. However, most optical switch matrices are still not practical because of the channel crosstalk and the need to individually adjust the drive voltages applied to the switch elements in order to obtain optimum operations.

As described hereinbefore, prior art configurations for optical switching matrices can be improved in terms of switching speed, traffic capacity, flexible connectivity, channel crosstalk, and control requirements. The evolution towards fiber-optic communication networks can be accelerated by an improvement in optical space switching fabric.

OBJECTS OF THE INVENTION

Accordingly, it is a primary object of this invention to obviate the above-noted and other disadvantages of the prior art.

It is a further object of this invention to provide an optical space switch architecture based on optical gate arrays which are fabricated from ultra-high-extinction cascaded coupled-waveguide optical modulators.

It is a further object of this invention to propose an optical space switch architecture having a cost-effective design, improved control tolerances, and large signal-to-crosstalk ratios.

It is a yet further object of this invention to provide an optical space switch architecture capable of supporting many broadband channels using integrated optics technology.

SUMMARY OF THE INVENTION

In one aspect of the present invention, an optical space-division switching architecture is constructed from high-extinction electro-optical gate arrays each comprised of a plurality of cascaded coupled-waveguide optical intensity modulators. The architecture permits the selective or full distribution of a plurality of input optical signals among a plurality of designated output ports. The front end of the architecture includes a plurality of passive splitter circuits, each having a single input port and a plurality of output ports, for receiving the input signals and evenly dividing each signal into a set of interim optical signals. Optical amplifier stages are cascaded with the splitter circuits if power compensation is necessary. Subsequent to the optical power splitting, the interim signals propagate through a first connection means coupled to the input ports of the electro-optic gate arrays whereupon each interim signal propagates through an optical modulator and emerges, depending upon the activation of the particular gate, in either an ON or OFF state. A second connection means coupled to the gate array accepts the binary optical signals emerging from the array and guides them to a plurality of passive combiner circuits each having a plurality of input ports and a single output port. The second connection means provides a connectivity configuration which allows the interim signals from each input optical signal to be fully distributed among the output ports of the combiner circuits. The combiner circuits, also cascaded with stages of optical amplifiers, if necessary, are each constructed in an inverse configuration to that of said splitter circuits for combining the incoming signals from the gate arrays into an output signal appearing at the respective single output port. A means for establishing the desired switching connections is to appropriately activate the operational state of the intensity modulators in each electro-optic gate array so that the input optical signals, once divided, are routed to the designated output ports of said combiner circuits.

DETAILED DESCRIPTION OF THE PREFERRED EMBODIMENT

Figure 8:
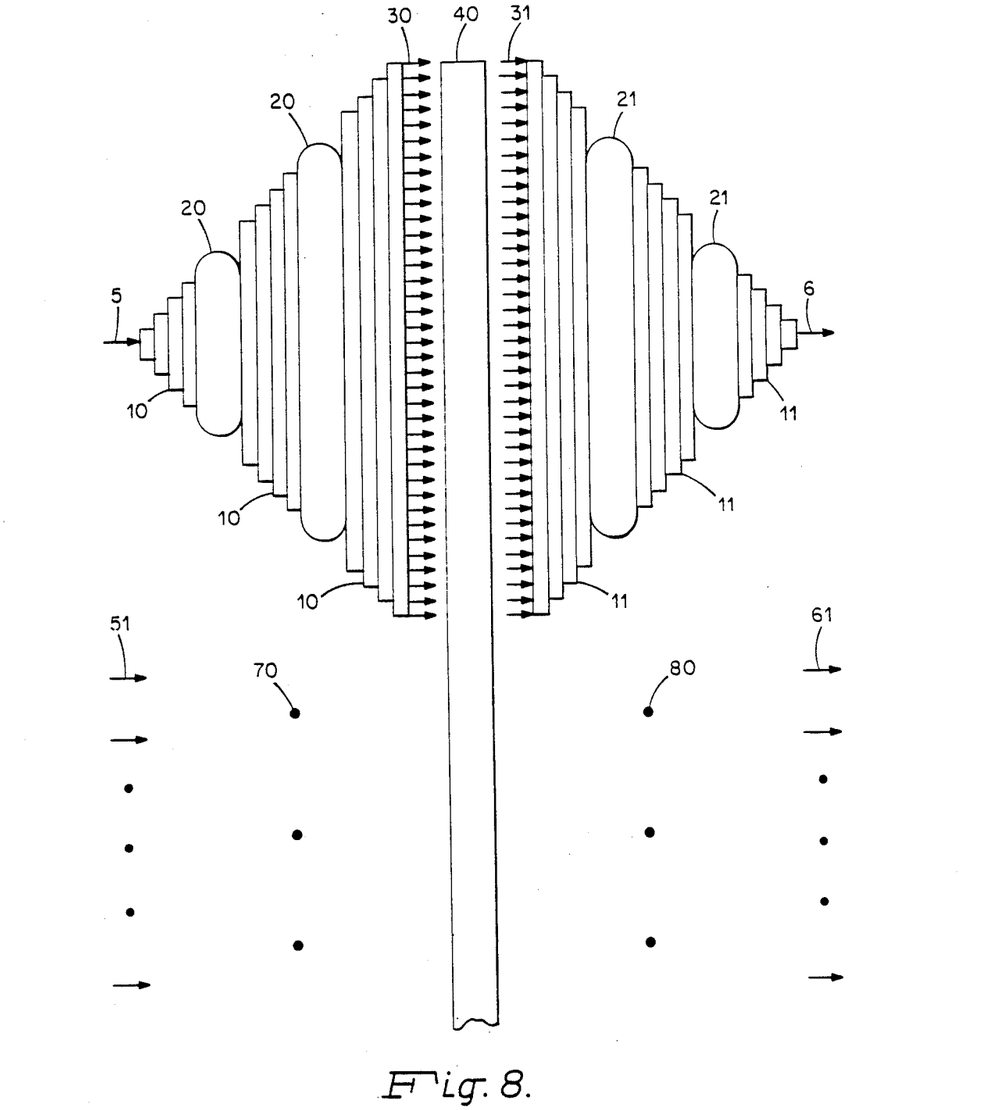
FIG. 8 is a circuit diagram of an optical space switch architecture according to the present invention.

FIG. 8 is a schematic diagram of an optical space switching architecture according to the present invention in which a plurality of input optical signals 51 are selectively distributed among a plurality of output ports 61. Referring to the upper structure in FIG. 8 illustrating the circuitry following a single input port 5 and preceding a single output port 6 for effecting the switching function, an input optical signal entering the switch matrix through input port 5 has its optical power evenly divided by a series of 1-to-N passive splitter circuits 10 into a plurality of interim optical signals 30. A set of optical amplifier arrays 20 operate in tandem with the passive splitter circuitry 10 to amplify the input optical signal. The optical amplifier arrays can be omitted if the system power budget allows so. The interim signals 30 individually propagate through fibers and emerge as the inputs to an optical gate array 40. The optical gate array described and illustrated herein has been disclosed in a copending U.S. Patent Application entitled ULTRA-HIGH-EXTINCTION CASCADED COUPLED-WAVEGUIDE OPTICAL MODULATORS AND OPTICAL GATE ARRAYS, Ser. No. 07/289,658, pending, filed Dec. 23, 1988 by the inventor of this application and assigned to the same assignee as this application. This related application is incorporated herein by reference, and specifically the drawings and the descriptions of the preferred embodiments are incorporated herein by reference with respect to the structure and operation of the optical space switching architecture.

In like manner the plurality of input optical signals 51 are applied to switching circuitry 70 constructed from cascaded stages of 1-to-N passive splitter circuitry and optical amplifier arrays, as described above with respect to a single input port 5, for the purpose of dividing the input signals into a plurality of interim signals and then distributing them to optical gate array 40.

Each of the interim optical signals entering optical gate array 40 propagates through one of the plurality of electro-optic gates which are collectively fabricated on a plurality of integrated wafers to form optical gate array 40. The gates are ultra-high-extinction optical intensity modulators as disclosed in the aforecited copending application, and are constructed from cascaded directional waveguide coupler sections. The plurality of optical signals emerging from optical gate array 40 are guided via fibers to a plurality of N-to-1 passive combiner circuitry 80, each constructed from cascaded stages of passive combiners and optical amplifier arrays 21. The waveguide connectivity configuration between the optical gate array 40 and passive combiner circuitry 80 allows the interim signals from each input optical signal, such as the interim signals 30 belonging to the input signal entering port 5, to be distributed to all of the output ports 61 if so desired. Referring specifically to the detailed structure in FIG. 8, single output port 61 is N-to-1 passive combiner circuitry 11 which receives a plurality of optical signals 31 from gate array 40 and combines them into a single output signal appearing at output port 6. Each of the signals 31 corresponds to an interim optical signal from each of the input signals which has been processed by a respective optical intensity modulator in gate array 40. Optical amplifier stages 21 function like those in splitter circuitry 10 and can be omitted if the power budget allows so. The switching connections for establishing the desired routing of the input signals 51 among output ports 61 are implemented by turning ON or OFF the appropriate electro-optic gates in optical gate array 40.

Figure 9:
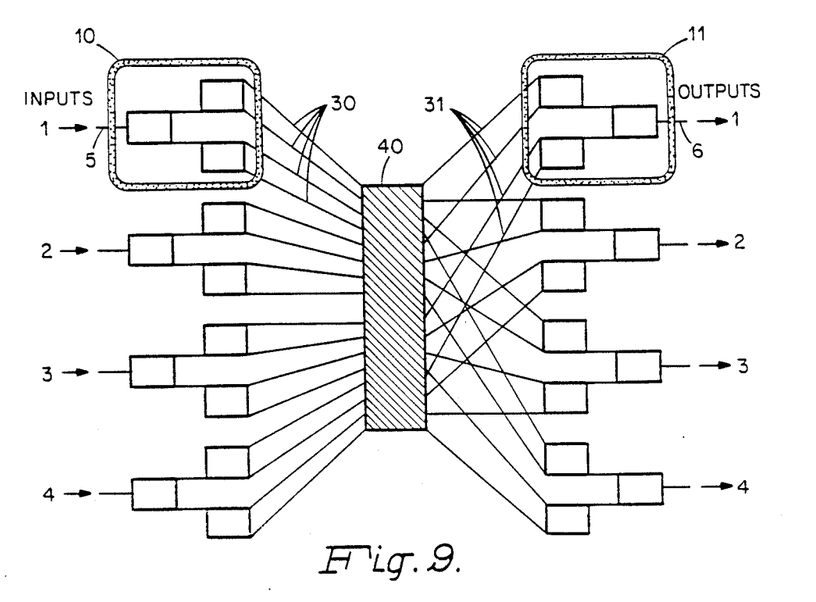
FIG. 9 is one embodiment of the switching architecture in FIG. 8.

In one embodiment of the present invention as shown in FIG. 9, a 4×4 optical switching matrix is constructed according to the present invention. An input optical signal enters 1×4 passive splitter circuitry 10 through input port 5 and is divided into four replicate interim signals 30 which are applied to optical gate array 40. A similar optical power division and distribution occurs for each of the input optical signals within a corresponding 1×4 passive splitter. The mesh connectivity between array 40 and each of 4×1 passive combiner circuitry 11 is such that an interim signal from each of the four input signals (shown collectively as signals 31) can emerge from array 40 and then propagate to As shown, the same point-to-multipoint connectivity is provided to each of the other output ports. The physical connection between splitter 10 and array 40 and between array 40 and combiner 11 can be accomplished via direct coupling or with optical fiber.

One measure of performance for the optical switch architecture in FIG. 8 involves the system control characteristics which are completely executed within the optical gate array 40. K. Koai and P. Liu, IEEE Journal of Quantum Electronics, 1986, showed that for a directional coupler switch fabricated with a coupling length $L_c$ and having an extinction ratio of $X=20$dB for both the bar and cross-state, the applied control voltages for the ON-state and OFF-state could be 0V ($\Delta\beta L_c=0$) and 10V ($\Delta\beta L_c=1.73\ \pi$), respectively, where $\Delta\beta$ is the mismatch between the propagation constants of the two waveguides. Using these results, an electro-optic gate array in accordance with the present invention can achieve an overall extinction ratio of 5×20dB=100dB for each optical gate when the gates are fabricated as rank-5 cascaded coupled-waveguide (CCW) modulators.

In a practical design, one usually cannot obtain such a high extinction ratio because of fabrication errors and control signal variations. From a first-order approximation, it can be shown that the extinction ratio of a directional coupler decreases from 20 dB to about 16 dB if the control signal variations are ±5 percent. The extinction ratio of a rank-5 CCW modulator therefore decreases from 100dB to about 80 dB. While an extinction ratio of 16 dB is only marginally good for the small-scale switch matrices, the 80 dB extinction ratio of the CCW-based optical gates permits the design of switch matrices of any practical size. In electro-optic systems where the control signals are in electrical form, for example, 0 V and 10 V, such an ultra-high extinction ratio can be achieved as long as the applied ON and OFF voltages are 0±0.5 V and 10±0.5 V, respectively. Such a tolerance of voltage variations implies that using a single set of electronics-grade power supplies and control circuits is enough to control an optical space switch of any practical size.

In an alternate embodiment of the present invention, the passive splitters and combiners are constructed from low-loss 3dB fiber couplers incorporated into the transmission medium. Referring back to FIG. 9, the 3dB couplers are represented by the blocked elements within passive splitter circuitry 10 and passive combiner circuitry 11. These fiber couplers are easily cascaded with the multiple stages of power-compensating optical amplifiers. A comparison of the system loss for the present invention with that of the prior art structures will be presented hereinafter.

The passive 1-to-N splitters and N-to-1 combiners, when constructed from 3dB fiber couplers, both incur a power loss of $(3+e)n$ dB, where $n=Log_2(N)$, and e is the excess loss of a 3-dB fiber coupler. The excess loss $E_k$ of a rank-k digital electro-optic CCW modulator is $E_k=Exk$, where E is the excess loss of a coupler section. With k=5, the excess loss $E_k$ of a rank-5 CCW modulator is only about 0.5 dB. Such optical gate arrays completely eliminate waveguide bends and crossovers in the optical signal paths. In addition, since these gates do not cascade with one another, there is no accumulation of loss within the optical gates. This is in contrast to both the crossbar and tree switch matrices which not only require waveguide bends to guide light to the designated switch elements, but also have accumulated loss associated with their switch matrix configurations.

The system loss $L_s$ for the proposed optical switch system in FIG. 8 is (1) $L_s = 2 \times n \times (3+e) + E_k + W - (m \times G)$ (dB), where W represents the sum of the coupling losses at the two waveguide-fiber interfaces and the waveguide propagation losses, and G represents the gain obtained by each of the m optical amplifiers. With the current technology, W is about 2-4 dB and G can be $\geq 20$ dB with either the semiconductor laser amplifiers or optical fiber amplifiers. The excess loss e of a 3 dB fiber coupler can be less than 0.5 dB. Comparatively, the system losses for the prior art switch matrices are (2) $L_s = (2 \times N - 1) \times E + q_c \times W - (m \times G)$ (dB) for the cross bar matrix, (3) $L_x = n \times (3+e+E) + q_h \times W - (m \times G)$ (dB) for the half-active tree matrix, and (4) $L_s = (2 \times n) \times E + (2 \times q_h) \times W - (m \times G)$ (dB) for the full-active tree matrix. The terms $q_c$ and $q_h$ are the number of cascaded integrated optical substrates connected by fibers for the crossbar and half-active tree architectures, respectively.

Figure 10:
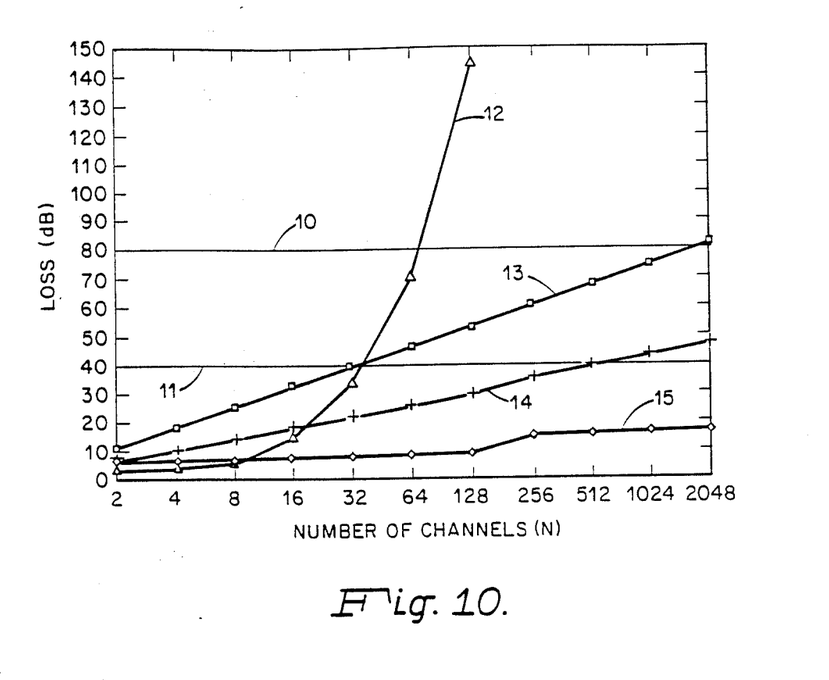
FIG. 10 is a graph comparing the system loss of prior art switch networks with that of the switching architecture of the present invention.

FIG. 10 graphically illustrates the calculated system losses for various switching architectures with the following design parameters: e=0.5 dB, E=0.2 dB, $E_k=E_5=1$dB, W=3dB, G=20dB, and m=0 (no optical amplifiers). Curves 12, 13, 14 and 15 represent the system loss for matrices based on the crossbar, gate array, half-tree, and full-tree architectures, respectively, as a function of the number of supported channels. The small jumps in curves 14 and 15 from N=128 to N=256 represent the increase in waveguide coupling and propagation losses caused by cascading another stage of integrated optical substrates.

As shown in FIG. 10, the system loss of the proposed gate-array-based architecture in FIG. 8 is almost twice as large as that of the half-active tree architecture, which also has the point-to-multipoint switching capability. As will be described hereinbelow, this apparent disadvantage of the proposed optical gate-array-based architecture can be avoided by using the aforementioned in-line optical amplifiers to compensate for the system loss. For example, the optical amplifiers permit the fabrication of a 2048×2048 lossless optical switch when four stages (two at either side) of optical amplifiers are used, whereas achieving a similar system scale (number of supported switching channels) in a prior art half-active tree architecture would be severely limited by noise characteristics.

The major sources of system noise for the optical switch in both the prior art and present invention are the accumulated crosstalk and the noise generated by optical amplifiers. The parameters used in evaluating device performance in this noisy environment include the signal-to-crosstalk ratio (SXR) and signal-to-noise ratio (SNR).

First considering the SXR expression, the system loss (or gain) in the optical switch system of FIG. 8 has the same effect on both the signal and the crosstalk terms. As such, the overall SXR is not affected by these terms and can be written in a 1st-order approximation as (5) $SXR = kX - 10Log(N-1)$ (dB), where k anc X are the rank and section extinction ratio of the CCW optical gates, respectively. Similar expressions for the SXR of other architectures are as follows:

(6) $SXR = X - 10Log(N-1)$ (dB) for a crossbar matrix, (7) $SXR = X - 10Log(n)$ (dB) for a half-active tree matrix, and (8) $SXR = 2X10Log(n)$ (dB) for a full-active tree matrix.

Figure 11:
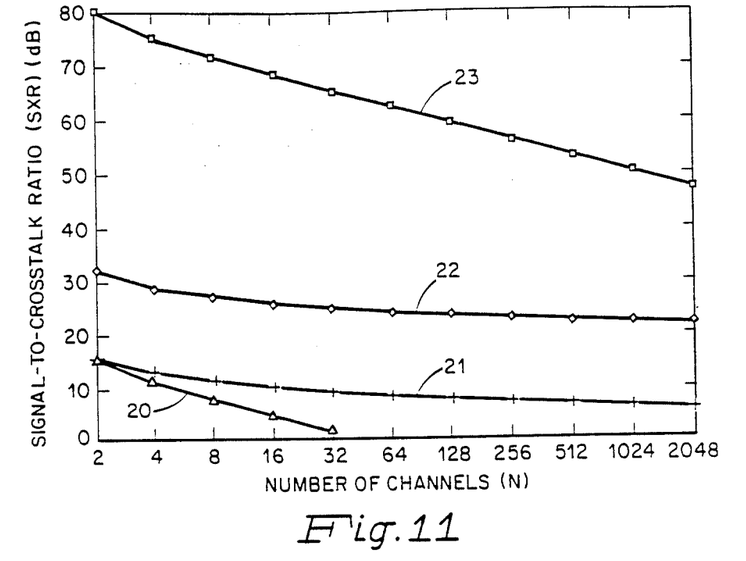
FIGS. 11 and 12 show the characteristic curves for the signal-to-crosstalk and signal-to-noise ratio, respectively, of selected prior art architectures and the optical space switch of the present invention.

The graph in FIG. 11 compares the system SXR for the crossbar, half-tree, full-tree, and gate-array-based architectures, as represented by curves 20, 21, 22 and 23, respectively. The individual directional waveguide coupler sections used in fabricating the optical gate array of the present invention were assumed to have an extinction ratio of 16 dB, which takes into account a ±5% control tolerance. The proposed architecture clearly has a superior performance in terms of SXR. Even for a matrix size as large as 2048×2048, the invention can still achieve an SXR of greater than 40dB.

Incorporating the optical amplifiers into an optical switch matrix directs our analysis of system noise towards the signal-to-noise ratio. The noise generated by optical amplifiers includes signal-spontaneous emission beat noise and the beat noise between the spontaneous emission components. A general equation for system SNR, considering both the SXR and the amplifier noise, is (9) $SNR = 10Log[10^{-r} + 10^{-p}]$, where $r = SXR/10$, $p = SNR_a/10$, and $SNR_a$ represents the worst-case signal-to-noise ratio associated with the optical amplifiers.

Figure 12:
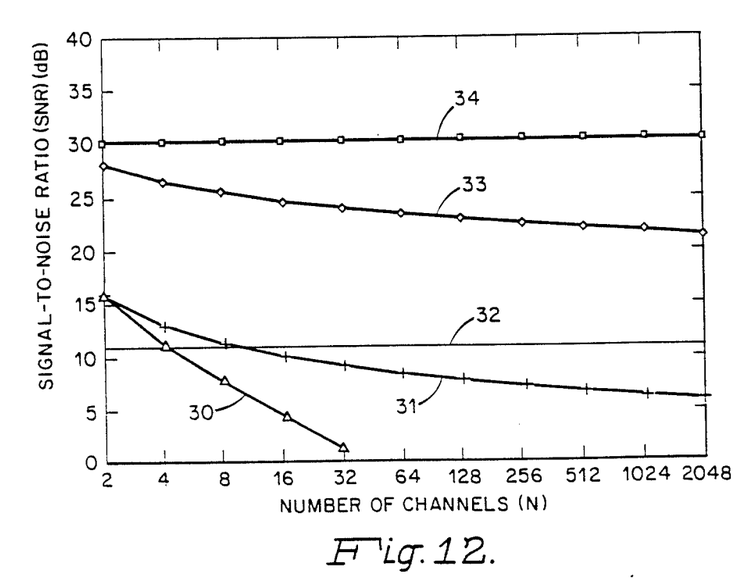

FIG. 12 shows the calculated signal-to-noise ratios of various switching architectures when $SNR_a = 30dB$, with the crossbar, half-tree, full-tree, and gate-array-based switches corresponding to curves 30, 31, 33, and 34. Even in the worst case, the proposed optical switch has a better SNR than those of the prior art. By excluding from consideration the prior art architectures which are not suitable for one-to-multipoint switching and further assuming that an SNR of greater than 11 dB is required for a bit error rate of less than $10^{-9}$, it is evident that the proposed architecture can support up to more than $2048 \times 2048$ switching channels, whereas the half-active tree architecture can support only up to $8 \times 8$ switching channels.

The optical switch system proposed in this application offers many new features for switching networks. The proposed gate-array-based optical space switches are relatively cost-effective in comparison with prior art architectures. Because of its superiority in the noise and crosstalk characteristics, the invention has the capability of supporting over $2000 \times 2000$ switching channels, each having a data capacity in excess of 100 Gbits/sec, in addition to providing the sophisticated one-to-one, one-to-many, and one-to-all switching functions which ar required by future switching networks. The optical splitters and combiners can be fabricated by 3-dB fiber couplers or on silica glass substrates which are rugged, inexpensive, low-loss, and easily expansible. These optical splitters and combiners can be mass produced since they are the basic elements for many types of networks such as passive distribution networks, transmissive star networks, and reflective star networks. The ultra-high-extinction optical gate arrays are compact in size, tolerant with control and fabrication errors, and can be fabricated using batch processing. These new features provide an excellent opportunity for the development of cost-effective broadband optical switching networks with sophisticated functionalities.

What is claimed is:

1. A broadband optical space-division switching architecture for selectively or fully distributing a plurality of ON/OFF input optical signals among a plurality of output ports, comprising:

a plurality of passive splitter circuits each evenly dividing an input optical signal into a plurality of interim optical signals;

a set of high-extinction electro-optic gate arrays each comprising a plurality of optical intensity modulators each of which consists of high-extinction cascaded directional waveguide coupler sections, each of said modulators receiving one of the plurality of interim optical signals from said splitter circuits and processing said one interim signal in accordance with a current operational state of said modulator;

each of said optical intensity modulators normally operating in an OFF state wherein the directional waveguide coupler sections of each optical modulator are cascaded together on a crystal substrate to form a bar-type modulator structure which provides a direct optical connection between the associated first section and the associated last section, and wherein each of said waveguide coupler sections includes a primary waveguide and a corresponding secondary waveguide forming a coupling region therebetween wherein each secondary waveguide has a bend structure so that an optical signal coupled into the secondary waveguide from said associated primary waveguide is guided out of said modulator, and each primary waveguide is contiguous with the primary waveguide in a next section so that the uncoupled signal propagates into the primary waveguide of said next section;

a first connection means providing said interim optical signals with an optical path connection between said splitter circuits and the optical modulators in said gate arrays;

a plurality of passive combiner circuits each having a single output port and constructed in an inverse configuration to that of said splitter circuits;

second connection means coupling said optical modulators to said passive combiner circuits whereby the ON/OFF optical signals from said gate arrays propagate to said combiner circuits;

each of said combiner circuits combining the incoming optical signals routed thereto by said second connection means into a single output signal appearing at the respective single output port of said combiner circuit; and means for establishing a desired switching connectivity between the input ports of said splitter circuits and the output ports of said combiner circuits by activating the appropriate operational state of each of said optical intensity modulators whereby the input optical signals are routed to their respective output ports in accordance with said desired connectivity.

2. The optical space switch as recited in claim 1 further includes:

a plurality of optical amplifier stages incorporated into each of said passive splitter circuits and passive combiner circuits.

3. The optical switch as recited in claim 1 wherein:

said passive splitter circuits and passive combiner circuits comprise a plurality of 3dB-fiber couplers; and said first connection means and second connection means are fibers when said splitter and combiner circuits are said 3dB fiber couplers.

4. The optical space switch as recited in claim 1 wherein each optical intensity modulator further includes:

in each of said sections, a pair of uniform electrodes placed in close proximity to said associated primary and secondary waveguides;

means for fabricating each modulator on an integrated optical wafer in parallel with said other modulators;

means for operating each of said optical modulators; such that in said normal OFF state mode, the interim optical signal received from said first connection means enters the primary waveguide of the first section and propagates successively through the primary waveguide of each following section while experiencing substantial coupling into each corresponding secondary waveguide, said modulator having the effect of providing an OFF signal at an output end of the last primary waveguide in said modulator; and in an ON state mode, the interim signal received from said first connection means enters the primary waveguide of the first section and propagates successively through the primary waveguide of each following section while very little optical power crossover occurs between each primary waveguide and said corresponding secondary waveguide, said modulator having the effect of allowing said interim signal to propagate substantially uncoupled through said modulator before exiting through the primary waveguide of said last section in said modulator and entering said second connection means.

5. The optical space switch as recited in claim 4 wherein:

each secondary waveguide has a coupling length for complete optical power crossover when said respective modulator is in said normal OFF state mode.

6. The optical space switch as recited in claim 4 wherein:

said electrodes are placed on top of said associated waveguides.

7. The optical space switch as recited in claim 4 wherein:

said electrodes are placed adjacent to said associated waveguides.

8. The optical space switch as recited in claim 4 wherein said means for operating an optical modulator in said ON state includes:

means for simultaneously changing the refractive index profile of each of said associated sections by applying a control voltage to said corresponding electrodes.

9. The optical space switch as recited in claim 1 wherein:

said primary waveguides in each modulator form a single waveguide.

10. A broadband optical space-division switching architecture for selectively or fully distributing a plurality of ON/OFF input optical signals among a plurality of output ports, comprising:

a plurality of passive splitter circuits each evenly dividing an input optical signal into a plurality of interim optical signals;

a set of high-extinction electro-optic gate arrays each comprising a plurality of optical intensity modulators each of which consists of high-extinction cascaded directional waveguide coupler sections, each of said modulators receiving one of the plurality of interim optical signals from said splitter circuits and processing said one interim optical signal in accordance with a current operational state of said modulator;

each of said optical intensity modulators normally operating in an ON state wherein the directional waveguide coupler sections of each optical modulator are cascaded together on a crystal substrate to form a cross-type modulator structure, and wherein each of said waveguide coupler sections includes a primary waveguide having a bend structure and a corresponding secondary waveguide together forming a coupling region therebetween wherein each secondary waveguide is contiguous with the primary waveguide in a next section such that an optical signal coupled into the secondary waveguide of one section from said corresponding primary waveguide propagates into the primary waveguide of said next section, and the remaining uncoupled signal present in the primary waveguide of said one section propagates out of said modulator through said respective waveguide bend;

a first connection means providing said interim optical signals with an optical path connection between said splitter circuits and the optical modulators in said gate arrays;

a plurality of passive combiner circuits each having a single output port and constructed in an inverse configuration to that of said splitter circuits;

second connection means coupling said optical modulators to said passive combiner circuits whereby the optical signals from said gate arrays propagate to said combiner circuits;

each of said combiner circuits combining the incoming optical signals routed thereto by said second connection means into a single output signal appearing at the respective single output port of said combiner circuit; and means for establishing a desired switching connectivity between the input ports of said splitter circuits and the output ports of said combiner circuits by activating the appropriate operational state of each of said optical intensity modulators whereby the input signals are routed to their respective output ports in accordance with said desired connectivity.

11. The optical space switch as recited in claim 10 wherein each optical intensity modulator further includes:

in each of said sections, a pair of uniform electrodes placed in close proximity to said associated primary and secondary waveguides;

means for fabricating each modulator on an integrated optical wafer in parallel with said other modulators;

means for operating each of said optical modulators; such that in said normal ON state mode, the interim optical signal received from said first connection means enters the primary waveguide of the first section and propagates successively through each subsequent section such that the optical signal present in the primary waveguide experiences nearly complete optical power crossover into the corresponding secondary waveguide whereupon the uncoupled signal propagates out of said modulator via waveguide bends and the coupled signal enters the primary waveguide of the next section, said modulator effectively allowing the interim signal to propagate through said modulator with negligible loss in intensity level before exiting through the secondary waveguide of said last section and entering said second connection means; and in an OFF state mode, the interim optical signal received from said first connection means enters the primary waveguide of the first section and propagates successively through each subsequent section such that the optical signal present in the primary waveguide experiences negligible optical power crossover into the corresponding secondary waveguide whereupon the uncoupled signal propagates out of said modulator via waveguide bends and the coupled signal enters the primary waveguide of the next section, said modulator having the effect of providing an OFF signal at an output end of the secondary waveguide in said last section.

12. The optical space switch as recited in claim 11 wherein:
    each secondary waveguide has a coupling length for complete optical power crossover when said respective modulator is in said normal ON state mode.

13. The optical space switch as recited in claim 11 wherein:
    said electrodes are placed on top of said associated waveguides.

14. The optical space switch as recited in claim 11 wherein:
    said electrodes are placed adjacent to said associated waveguides.

15. The optical space switch as recited in claim 11 wherein said means for operating an optical modulator in said OFF state includes:

means for simultaneously changing the refractive index profile of each of said associated sections by applying a control voltage to said corresponding electrodes.

16. The optical space switch as recited in claim 10 wherein:
    each secondary waveguide of each modulator forms a single waveguide with the primary waveguide in said next section.

17. The optical space switch as recited in claim 10 further includes:
    a plurality of optical amplifier stages incorporated into each of said passive splitter circuits and passive combiner circuits.

18. The optical switch as recited in claim 10 wherein:
    said passive splitter circuits and passive combiner circuits comprise a plurality of 3dB fiber couplers; and
    said first connection means and second connection means are fibers when said splitter and combiner circuits are said 3dB fiber couplers.

* * * * *